Patented Sept. 5, 1933

1,925,879

UNITED STATES PATENT OFFICE 1,925,879

RUBBER PRODUCT AND METHOD OF MAKING THE SAME

George Oenslager, Akron, Ohio, assignor to The B. F. Goodrich Company, New York, N. Y., a corporation of New York No Drawing. Application October 9, 1930
Serial No. 487,503

6 Claims. (Cl. 18—53)

This invention relates to the art of rubber manufacturing, and particularly to the production of certain derivatives of rubber.

It has long been known that rubber is capable of undergoing profound changes in its physical and chemical properties when it is heated with sulphur or treated with sulphur chloride. These changes constitute the phenomenon known as "vulcanization", by virtue of which rubber is changed from a rather soft, although extensible, plastic substance, to a tough, resilient, "soft vulcanized rubber" or a hard and brittle "hard rubber". An object of this invention is to produce a rubber derivative with properties different from those of the vulcanized rubbers heretofore known, but more useful for certain purposes than the previously known substances.

This invention consists in preparing the reaction product of rubber and sulphur dioxide and in a preferred embodiment in forming the rubber to the shape which it is intended to have after the treatment, and treating it with sulphur dioxide under pressure. The compressed sulphur dioxide is absorbed by the rubber, and gradually reacts therewith, converting the rubber to a more or less tough, horny, and relatively inextensible mass.

Rubber readily absorbs sulphur dioxide, the amount absorbed depending on the nature of the rubber, the character of whatever added ingredients may be present, and on the temperature and pressure of the sulphur dioxide. At room temperature and at the pressure of liquid sulphur dioxide at the same temperature, unvulcanized rubber will absorb the sulphur dioxide until its weight is more than doubled. If the pressure is relieved immediately, the sulphur dioxide escapes again without combining with the rubber to any appreciable extent. If the rubber is soft and plastic and the pressure is released too suddenly, the escaping sulphur dioxide may blow the rubber full of holes like a rubber sponge.

The reaction between the sulphur dioxide and the rubber is not very rapid. At ordinary room temperature several days may be required for a complete chemical saturation of the rubber by the sulphur dioxide. The reaction is especially slow if the rubber and the sulphur dioxide are thoroughly purified. Certain of the impurities naturally present in rubber, possibly the proteins, appear to catalyse the reaction to some extent. The addition of certain pigments or of aniline or certain oxidizing agents such as benzoyl peroxide has a similar effect. The most pronounced effect, however, is caused by the presence of oxygen or air in the sulphur dioxide. While pure sulphur dioxide combines with rubber only very slowly, compressed sulphur dioxide containing a small proportion of oxygen is capable of saturating the rubber almost completely in the course of only a few days, three or four days being sufficient at room temperature. Sulphur dioxide at a lower pressure requires a somewhat longer time.

Pigments, fillers, etc., may, if desired, be mixed with the rubber before the treatment with compressed sulphur dioxide. However, certain substances, such as litharge, gas black, sulphuric acid, and certain organic nitrogen compounds greatly slow down the reaction between the rubber and the sulphur dioxide. The reason for this peculiar action is not understood, since other substances with similar physical and chemical properties have little or no effect on the reaction.

The thickness of the rubber is not of very great importance, as the compressed sulphur dioxide is readily soluble in rubber and quickly penetrates even thick sheets. However, the combination of the sulphur dioxide with the thick rubber is somewhat slower than with thin rubber, possibly because the oxygen required to catalyse the reaction does not penetrate the thick sheets as readily as the others.

The reaction may be arrested at any desired point. The pressure of the compressed sulphur dioxide on the rubber is preferably slowly released to prevent the formation of bubbles or blisters by the escaping sulphur dioxide absorbed in the rubber, and finally the treated rubber is aerated to permit the evaporation of substantially all the uncombined sulphur dioxide.

Rubber containing only a small proportion of combined sulphur dioxide, say from 1 to 10%, is resilient and extensible, is not appreciably affected by changes of temperature, and swells in the ordinary rubber solvents without dissolving. In other words, it somewhat resembles soft vulcanized rubber. As the proportion of combined sulphur dioxide is increased, the product becomes tougher and less resilient and extensible and less capable of swelling in rubber solvents. A product containing about 20% of combined sulphur dioxide, for example, very much resembles pure gutta-percha in its physical properties. As the rubber approaches the point of chemical saturation it becomes still harder, the completely saturated product containing about 32% of combined sulphur dioxide being quite hard and horny, although somewhat brittle. The reaction of the rubber with sulphur dioxide does not cause any great change in its appearance, except possibly a slight darkening. The product has a pleasing amber color and is translucent like pure rubber itself. When about half saturated (19% combined sulphur dioxide) it has a specific gravity of approximately 1.1 as contrasted to 0.93 for rubber.

This invention is not restricted to unvulcanized rubber. Vulcanized rubber may also be combined with compressed sulphur dioxide, although the reaction is somewhat slower than with unvulcanized rubber. The rubber hydrocarbons, gutta-percha and balata, react in a similar manner and can likewise be completely saturated with sulphur dioxide, forming a hard, inextensible product.

The reaction product of rubber and sulphur dioxide is much more resistant to the action of acids, organic solvents, etc., than is rubber, and withstands heating and oxidation much better. It is, therefore, a very useful substitute for rubber for conditions under which rubber deteriorates rapidly.

As a specific example of one method of carrying out this invention, a sheet of rubber, say ⅛ inch thick, is placed in a pressure vessel and sulphur dioxide gas is admitted from a cylinder of the liquefied gas, until the pressure in the two containers is the same. The air originally present in the pressure vessel serves to catalyze the reaction between the rubber and the sulphur dioxide. After twelve hours approximately 2% of sulphur dioxide is combined with the rubber. After twenty-four hours the proportion of combined sulphur dioxide in the rubber is about 11%, after forty-eight hours 19%, after seventy-two hours 25%, and after ninety-six hours 30%, which corresponds to a practically complete saturation. After the desired proportion of sulphur dioxide has combined with the rubber, preferably from 10% to 25%, the pressure is released and the product is aerated to permit the elimination of excess sulphur dioxide.

Since the product of the reaction of rubber with sulphur dioxide has lost its plasticity and can no longer be molded or otherwise shaped except by cutting or trimming, the rubber is shaped before the treatment, by any of the well-known methods, such as by calendering, extruding, molding, dipping forms in solutions or dispersions, etc. If it is desired to coat metal or other articles permanently with the product the rubber is preferably firmly adhered to the base before its reaction with the sulphur dioxide.

It is to be understood that the term "rubber", unless otherwise limited, is employed in the appended claims in a generic sense to include caoutchouc, whether natural or synthetic, gutta-percha, balata, reclaimed rubber, and like products. It is further to be understood that the scope of the invention is not limited in any way by any theories herein advanced by way of explanation, but is only limited as may be required by the prior art and as indicated in the appended claims.

I claim:

1. The method which comprises treating solid rubber with sulphur dioxide in the presence of oxygen until the product of the reaction of the sulphur dioxide with the rubber contains from 10 to 25% of combined sulphur dioxide.

2. The method of making articles comprising the reaction product of rubber and sulphur dioxide which comprises forming solid rubber to the desired shape, and treating the formed rubber with compressed sulphur dioxide in the presence of oxygen.

3. The method of making articles comprising the reaction product of rubber and sulphur dioxide which comprises forming solid rubber to the desired shape, and treating the formed rubber with compressed sulphur dioxide in the presence of air until the product of the reaction of the sulphur dioxide with the rubber contains from 10 to 25% of combined sulphur dioxide.

4. A rubber product comprising rubber chemically combined with more than 10% of sulphur dioxide.

5. A rubber product comprising rubber chemically combined with from 10 to 25% of sulphur dioxide.

6. Shaped articles of a hard relatively inextensible composition comprising rubber chemically combined with from 10 to 25% of sulphur dioxide.

GEORGE OENSLAGER.